United States Patent [19]

Erickson

[11] Patent Number: 5,272,891
[45] Date of Patent: Dec. 28, 1993

[54] INTERMITTENT SORPTION CYCLE WITH INTEGRAL THERMOSYPHON

[76] Inventor: Donald C. Erickson, 1704 S. Harbor La., Annapolis, Md. 21401

[21] Appl. No.: 964,654

[22] Filed: Oct. 21, 1992

[51] Int. Cl.⁵ .................................................. F25B 17/02
[52] U.S. Cl. ........................................ 62/477; 62/480; 62/481
[58] Field of Search ............... 62/476, 477, 480, 481, 62/482, 489, 324.2

[56] References Cited

U.S. PATENT DOCUMENTS

| 1,646,520 | 10/1927 | Bayer | 62/477 |
|---|---|---|---|
| 1,833,901 | 12/1931 | Hull | 62/477 |
| 1,992,745 | 2/1935 | Elfving | 62/480 |
| 2,293,556 | 8/1942 | Newton . | |
| 2,446,636 | 8/1948 | Coons | 62/118 |
| 2,452,635 | 11/1948 | Coons . | |
| 2,660,163 | 11/1953 | Whitney et al. | 62/238.3 |
| 4,509,337 | 4/1985 | Wiart et al. | 62/235.1 |
| 4,739,631 | 4/1988 | Paeye | 62/478 |
| 4,744,224 | 5/1988 | Erickson | 62/235.1 |
| 4,993,234 | 2/1991 | Korsgaard | 62/235.1 |

FOREIGN PATENT DOCUMENTS 2436249 2/1976 Fed. Rep. of Germany ........ 26/476

Primary Examiner—Albert J. Makay
Assistant Examiner—William C. Doerrler

[57] ABSTRACT

Intermittent sorption cycles with fixed heat supply and removal and comprised of a generator/absorber (4), a condenser (2), and a receiver/evaporator (10) are adapted and simplified so as to require at most only two control valves (8) and (15) for their operation. With an integral thermosyphon (6) for absorption heat removal, only a single refrigerant charge is necessary. The two valves are advantageously combined into a single three-way ball valve, and key gravity drains (14) and (17) are provided. Applications include hot water heating, solar refrigeration, and steam generation.

13 Claims, 2 Drawing Sheets

5,272,891

INTERMITTENT SORPTION CYCLE WITH INTEGRAL THERMOSYPHON

DESCRIPTION

The technical field of this invention is intermittent sorption cycles which include an integral thermosyphon and which are useful for heat pumping and/or refrigeration.

BACKGROUND

Intermittent sorption cycles are conceptually very simple. In practice, however, an undesirable degree of complexity has heretofore been involved in their construction and/or operation. The very simplest cycles (two containers and a connecting conduit) require manual application and removal of heat. The more complex cycles, having heat supply and heat rejection means permanently located, have multiple components and control mechanisms which inflate their cost and reduce their reliability.

It is usual in intermittent sorption cycles to have the sorbent located in a single container which serves as both generator and absorber, plus separate components as the condenser and the evaporator. U.S. Pat. Nos. 4,183,227, 4,739,631, 4,742,868, 4,509,337 and 2,452,635 are examples of this.

It is desirable to have as much of the heat transfer required by the absorption cycle as possible brought about by thermosyphon (gravity heat pipe) operation. This avoids the need for pumped heat transfer loops. U.S. Pat. Nos. 2,293,556, 4,993,234, and 5,083,607 are examples of this.

In particular, it is desirable to cool the generator/absorber with a thermosyphon when it is in the absorb mode. However, rather than supplying a separate thermosyphon condenser (cold end), it is especially desirable to use the sorption cycle condenser also as the thermosyphon condenser. This is referred to as an integral thermosyphon. In addition to avoiding the need for a second condenser, it also avoids the need for a second refrigerant charge, as some of the cycle refrigerant is used as the thermosyphon working fluid. Prior art examples of an integral thermosyphon are found in U.S. Pat. Nos. 2,446,636 and 4,744,224.

The integral thermosyphon configuration has heretofore presented two problems: first, in order to turn the thermosyphon off and on at appropriate times, and also in order to isolate it from the remainder of the system when it is turned on and hence at high pressure, it has heretofore been necessary to have at least three refrigerant valves in the cycle. Secondly, when the thermosyphon is turned off, it is still partially full of liquid, and prior art systems cause a significant part of that liquid to be wastefully boiled away, resulting in a thermal loss. It would be much better to have the liquid removed from the thermosyphon by gravity drain (assisted by a very slight pressure boost).

What is needed, and one object of this invention, is a means for achieving the benefits of an integral thermosyphon in an intermittent sorption cycle while only requiring one or at most two valves for controlling the cycle, not the three or more traditionally required. A further need and objective is to provide a more efficient integral thermosyphon, i.e., one which when cut out need not evaporate the liquid from the TS evaporator, and which avoids thermal loss due to liquid drainback when cutout.

DISCLOSURE OF INVENTION

The above and other useful objects are provided by an intermittent sorption cycle comprised of a generator/absorber containing a sorbent material; an evaporator which is optionally integrated with a receiver and which is in vapor communication with said generator/absorber; a thermosyphon evaporator which is in heat exchange relationship with said generator/absorber; a condenser which is located at a higher elevation than said thermosyphon evaporator; a reservoir for liquid refrigerant which is located below and in fluid communication with said condenser; characterized by: a vapor conduit including a cutout valve which connects the top of the thermosyphon evaporator to the fluid communication between the condenser and the reservoir liquid; a fluid conduit including a cutout valve which connects the receiver and the generator/absorber to the same fluid communication; and a liquid conduit which connects the bottom of said reservoir to the bottom of said thermosyphon evaporator and which has a low point which is lower than said thermosyphon evaporator, whereby the connection to said thermosyphon evaporator is via an uphill liquid leg. Preferably the two cutout valves are combined into a single three-way valve which ensures one cutout valve is always closed when the other is open, and which requires only a single operating mechanism.

The two-valve (or equivalently the single three-way valve) system is functional and useful independent of the uphill liquid leg; and similarly the combination of the thermosyphon (TS) evaporator vapor cutout valve plus the uphill liquid leg is functional and useful independent of the vapor-liquid cutout between the condenser and the receiver. The greatest benefit is obtained from the combination of all three features, especially when the sorbent is a solid.

All known combinations of refrigerant and sorbent can be applied in this apparatus. Preferred refrigerants are $H_2O$, $NH_3$, MMA, methanol, $SO_2$, $CO_2$, hydrocarbons, and halogenated hydrocarbons. Solid sorbents may be either the adsorbents such as molecular sieve/zeolite, activated carbon, silica gel, and alumina; or absorbents (coordination compounds) such as alkaline earth halides, $Na_2S$, $Na_2SO_4$, and $HBO_2$; and alkaline earth oxides/hydroxides (e.g., $MgO$—$Mg(OH)_2$).

The apparatus finds use variously as a hot water heater; as a refrigerator/icemaker (powered, for example by solar energy); or as a low pressure steam generator. Both the hot water heater and the steam generator are heat pumps—they deliver both the condensation heat and the absorption heat (via the thermosyphon/condenser) to the load. One advantageous method for the hot water heater evaporator to be supplied waste heat is from an air conditioning duct. The refrigerator delivers useful cooling at the evaporator, and usually rejects waste heat to ambient at the condenser, although it optionally can usefully apply that heat, e.g., to domestic water heating.

The high temperature heat input can be any known source, e.g., fuel combustion, electric resistance heating, or solar thermal. When fuel combustion powers the water or steam heat pump, it is desirable to exhaust the combustion gas by way of thermal contact with the water being heated, whereby more useful energy is extracted.

The three-way valve should have the evaporator/receiver port open whenever heat is applied to the generator, and the thermosyphon port open at other times. With a suitable actuation bulb or bellows located at the generator, the applied heat can cause appropriate actuation of the three-way valve. Any other type of temperature induced actuation can also be used. Alternatively an electric actuator can be used. For gas flame devices, the required electric energy can be obtained from a thermal to electric converter of known type. That electricity can also be used to power an evaporator fan and a burner controller, making the appliance independent of any electric input. The valve can also be manually operated if preferred.

BEST MODE FOR CARRYING OUT THE INVENTION

Figure 1:
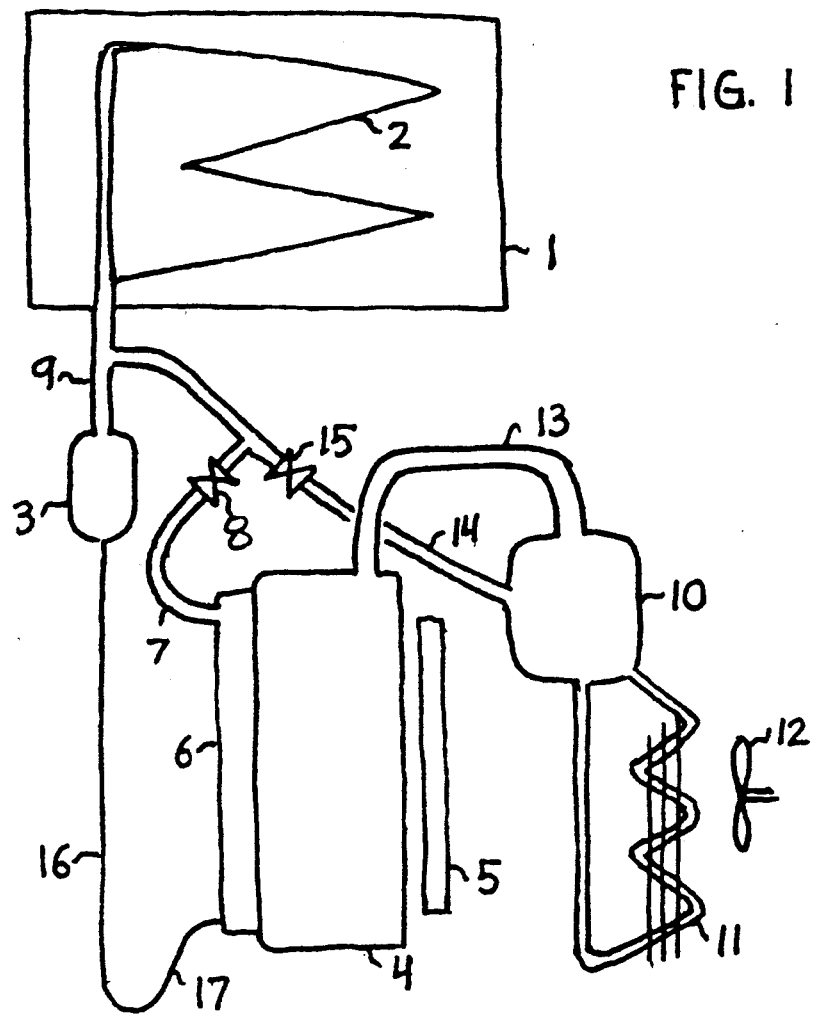
FIG. 1 is a schematic flowsheet of the invention depicting one embodiment of the water heater heat pump, particularly for supra-atmospheric pressure refrigerants.

Referring to FIG. 1, a tank 1 containing water to be heated has condenser 2 disposed within it. A liquid reservoir 3 collects condensate which drains from condenser 2. A generator/absorber 4 contains sorbent material, and is in heat exchange relationship with both a heat source 5 (e.g., electric resistance heater) and thermosyphon evaporator 6. A conduit 7 containing vapor cutout valve 8 connects the upper portion of TS evaporator 6 to the conduit 9 connecting condenser 2 to reservoir 3. A combined receiver/evaporator 10 including heat transfer coils 11 and means for air circulation 12 is in vapor communication with generator/absorber 4 via conduit 13. Conduit 14 including fluid cutout valve 15 connects the vapor space of receiver 10 to the fluid communication between condenser 2 and reservoir 3, i.e., to conduit 9. Conduit 14 is inclined downhill so as to allow liquid to drain by gravity to receiver 10 and is sized to allow countercurrent vapor-liquid flow. Liquid conduit 16 connects the bottom of reservoir 3 to the bottom of thermosyphon evaporator 6, and includes an uphill section 17 at the entry to TS evaporator 6.

In operation, when high temperature heat 5 is applied, valve 8 shuts and slight pressure buildup in TS evaporator 6 forces the TS liquid to reservoir 3, with the liquid level ending up in segment 17. Desorbed vapor condenses in condenser 2, and condensate collects in reservoir 3 until it overflows through valve 15 into evaporator 10. Note desorbed vapor travels uphill through conduit 14, counter-currently to the liquid condensate. Conduit 13 is connected in such a manner that the condensate would have to go uphill to get into generator/absorber 4.

When desorption is complete and a full charge of liquid refrigerant is in evaporator 10, the high temperature heat is interrupted and valves 8 and 15 are repositioned, valve 8 to open and valve 15 to shut. Opening of valve 8 allows liquid to flow by gravity from reservoir 3 into thermosyphon evaporator 6, where evaporation occurs, sending vapor to condenser 2. This thermosyphoning action cools the sorbent, thereby reducing system pressure. Fan 12 delivers waste heat to the refrigerant causing evaporation and subsequent absorption into the sorbent. The heat of sorption is transferred to the condenser by the thermosyphon.

Figure 2:
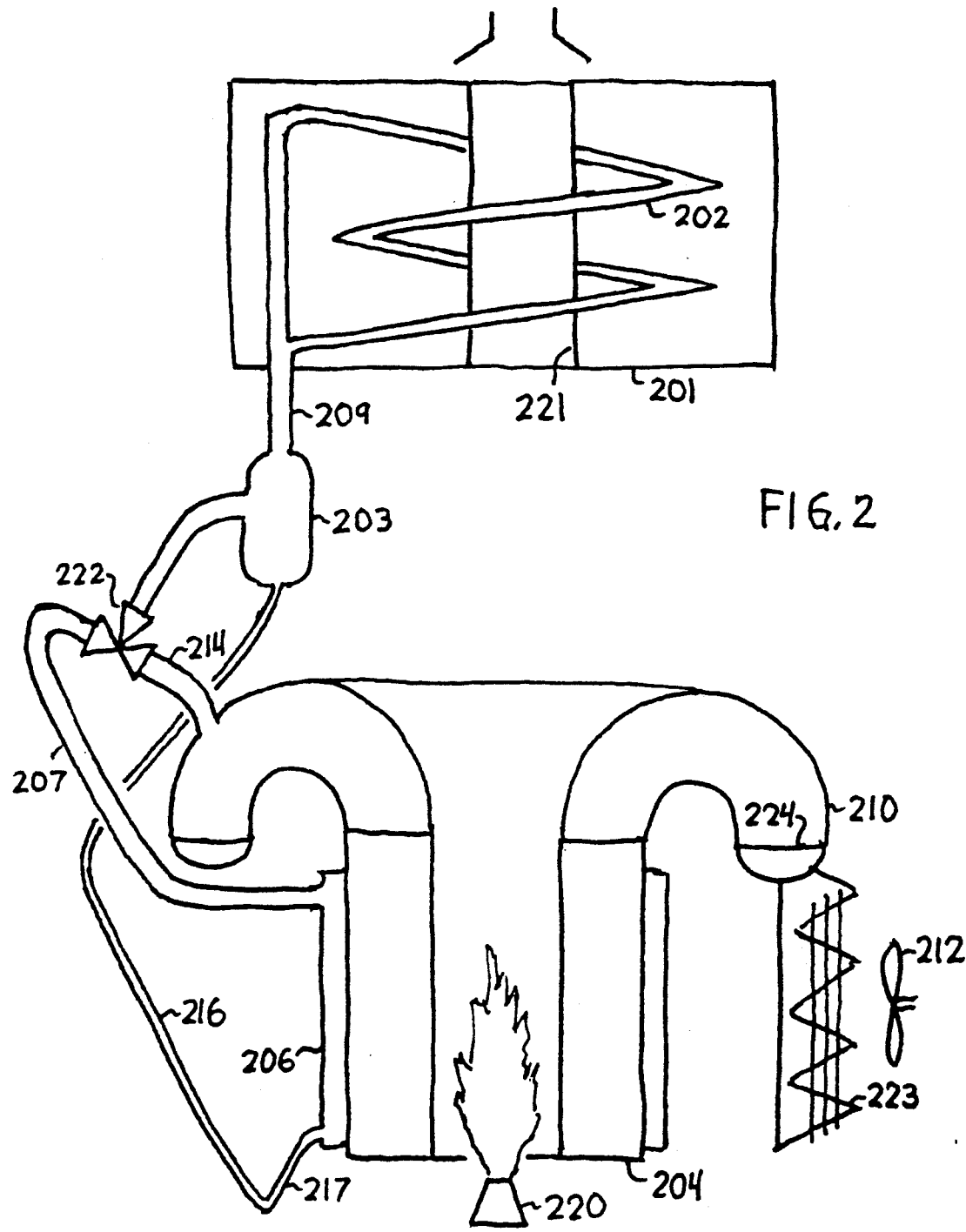
FIG. 2 depicts another embodiment of the water heat pump more suited to vacuum operation.

FIG. 2 illustrates some modifications to the FIG. 1 flowsheet which would be desirable when a flame 220 is the source of heat and when a low pressure refrigerant such as $H_2O$ is used, requiring larger flow area between evaporator 210 and generator/absorber 204. Both of those components are shown with annular cross section, and likewise thermosyphon evaporator 206 is annular. Combustion gas exhausts through flue 221 thereby imparting more heat to the water in tank 201. Three way valve 222 has a common port connected to reservoir 203, and one selection port connected to TS evaporator 206 via conduit 207, the other selection port connected to evaporator 210 via conduit 214. Since the refrigerant is at low pressure, a separate waste heat thermosyphon 223 is used to deliver heat across heat transfer surface 224 to the refrigerant in evaporator 210.

Figure 3:
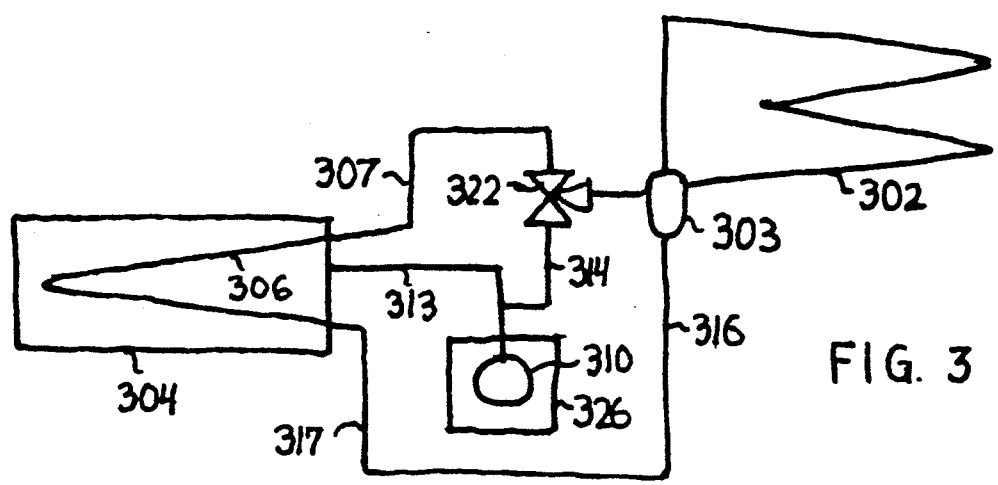
FIG. 3 depicts a solar-powered refrigeration embodiment.

Referring to FIG. 3, the sorbent is contained in generator/absorber 304 which is heated by solar radiation. Thermosyphon evaporator 306 is in heat exchange relationship with the sorbent. Three-way valve 322 connects the condenser 302 and reservoir 303 vapor spaces either to the TS evaporator 306 via conduit 307 or to the vapor spaces of generator/absorber 304 and evaporator 310 via conduit 314. Conduit 314 is inclined to allow gravity drain of condensate to evaporator 310, and sized to allow counter-current vapor liquid flow. Conduit 325 is inclined such that condensate can not drain by gravity to generator/absorber 304. The evaporator 310 is enclosed in insulated enclosure 326, the refrigerated space. Condenser 302 rejects heat to ambient. Valve 322 is repositioned in the morning and in the evening—it may be heat-actuated, e.g., from a wax bellows which is heated by sunlight, or it may be manually operated.

Other like-numbered components of FIG. 3 are similar in function to the corresponding FIG. 1 and FIG. 2 components.

It is desirable to insulate at least the receiver portion of each evaporator, as otherwise it would undesirably act as a condenser in the generate mode.

The preferred sorbents for $NH_3$ are activated carbon (adsorbent) and $SrCl_2$ (absorbent), where the latter would be compacted with a medium such as carbon to preclude damaging shrinkage and swelling and to improve heat and mass transfer.

The preferred sorbents for $H_2O$ are molecular sieve or activated carbon (adsorbent), and various absorbents dependent on the desired lift.

Although solid sorbents are preferred, clearly the disclosed invention is functional and useful with known liquid sorbents as well.

I claim:
1. An intermittent cycle sorption heat pump for at least one of heating and cooling, comprised of:
 a) at least one containment of a sorbent including a sorbate which is substantially free of inert gas;
 b) a heat source in heat exchange relationship with said sorbent;
 c) a thermosyphon evaporator in heat exchange relationship with said sorbent;
 d) a condenser located above said thermosyphon evaporator;
 e) an evaporator which is in vapor communication with said sorbent containment;

f) a liquid refrigerant reservoir located below and connected to the lower part of said condenser; characterized by:

g) a first conduit including a first means for flow cutout, said first conduit connecting a point above at least part of said reservoir to the top portion of said thermosyphon evaporator; and h) a second conduit including a second means for flow cutout, said conduit connecting a point above at least part of said reservoir to said evaporator.

2. The apparatus according to claim 1 additionally characterized by:

a) said second conduit dimensioned so as to permit countercurrent vapor-liquid flow therein;
   b) said second conduit inclined so as to allow liquid to flow by gravity to said evaporator; and
   c) a third conduit which connects the bottom portion of said reservoir to the bottom portion of said thermosyphon evaporator, and which has a low point which is below said thermosyphon evaporator and is inclined uphill from said low point.

3. The apparatus according to claim 1 additionally characterized by:

a) said first and second means for cutout comprised of a single three-way valve.

4. The apparatus according to claim 1 additionally characterized by:

a) means to prevent liquid condensate from flowing by gravity to said containment.

5. The apparatus according to claim 1 wherein said sorbent is a solid selected from the list comprised of alkaline halides, activated carbon, molecular sieve, and MgO; and said refrigerant is selected from the list comprised of $H_2O$, $NH_3$, methanol, $SO_2$, $CO_2$, $NH_2CH_3$, hydrocarbons, and halogenated hydrocarbons.

6. The apparatus according to claim 1 adapted for heating hot water and additionally characterized by a) a hot water tank in heat exchange relationship with said condenser;
   b) a means for circulating at least one of space air and duct air in heat exchange relationship with said evaporator.

7. The apparatus according to claim 1 adapted for producing refrigeration and additionally characterized by:

a) a means for supplying solar thermal heat to said containment; and
   b) a cold box enclosing at least part of said evaporator.

8. An intermittent cycle sorption heat pump for at least one of heating and cooling, comprised of:

a) at least one generator/absorber which contains a sorbent:
   b) a heat source in heat exchange relationship with said generator/absorber;
   c) a thermosyphon evaporator in heat exchange relationship with said generator/absorber;
   d) a condenser located above said generator/absorber;
   e) a liquid refrigerant receiver for a refrigerant capable of being absorbed by said sorbent;
   f) an evaporator which is in vapor communication with said generator/absorber;
   g) a liquid refrigerant reservoir located below and in fluid communication with the lower part of said condenser; characterized by:
   h) a first conduit including a first fluid cutout valve, said first conduit communicating at one end with the vapor space above at least part of said reservoir, and communicating at the other end with the top portion of said thermosyphon evaporator; and
   i) a second conduit which connects the bottom portion of said reservoir to the bottom portion of said thermosyphon evaporator, said second conduit having a low point which is at a lower elevation than said thermosyphon evaporator.

9. The apparatus according the claim 8 additionally characterized by:

a) a third conduit including a second fluid cutout valve connecting said receiver and said evaporator to said condenser, dimensioned so as to permit countercurrent vapor-liquid flow therein; and
   b) said third conduit inclined so as to allow liquid to flow by gravity to said receiver.

10. The apparatus according to claim 9 additionally characterized by:

a) said first and second cutout valves combined into a single three-way valve; and
    b) a temperature-sensing actuator for said three-way valve which causes the thermosyphon port to be closed and the receiver/generator port to be open whenever heat is applied to said generator/absorber.

11. A heat pump for heating hot water comprised of:

a) a solid sorbent contained in a generator/absorber;
    b) a condenser in heat exchange contact with said hot water;
    c) an evaporator in heat exchange contact with a waste heat source;
    d) a thermosyphon which transfers absorption heat from said absorber to said hot water; and
    e) a means for turning on and off said thermosyphon comprised of a reservoir for thermosyphon liquid and a cutout valve in the thermosyphon vapor line.

12. The heat pump according to claim 11 wherein said condenser receives vapor from the generator when heat is supplied to the generator, and from the thermosyphon at other times, and further comprising an uphill liquid conduit to the bottom of said thermosyphon.

13. The heat pump according to claim 12 additionally comprising an actuator for said cutout valve which actuates it when heat is supplied to the generator.

* * * * *